United States Patent [19]

Gautier et al.

[11] Patent Number: 5,233,904
[45] Date of Patent: Aug. 10, 1993

[54] PNEUMATIC BRAKE BOOSTER WITH ADJUSTABLE JUMP

[75] Inventors: Jean-Pierre Gautier; Ulysse Verbo, both of Aulnay-Sous-Bois, France

[73] Assignee: Bendix Europe Services Techniques, Drancy, France

[21] Appl. No.: 866,627

[22] Filed: Apr. 10, 1992

[30] Foreign Application Priority Data

Apr. 17, 1991 [FR] France ............... 91 04704

[51] Int. Cl.⁵ .............................................. F15B 9/10
[52] U.S. Cl. ........................... 91/369.002; 91/376 R; 92/99
[58] Field of Search ............... 91/376 R, 369.1, 369.2, 91/369.3; 92/96, 98 R, 99

[56] References Cited

U.S. PATENT DOCUMENTS

| | | | |
|---|---|---|---|
| 3,807,280 | 4/1974 | Green et al. ................... | 91/376 R |
| 4,487,105 | 12/1984 | Harrison ..................... | 91/376 R X |
| 4,794,844 | 1/1989 | Taft ........................... | 91/369.3 |

FOREIGN PATENT DOCUMENTS

| | | | |
|---|---|---|---|
| 3413739 | 10/1985 | Fed. Rep. of Germany ..... | 91/369.1 |
| 3941604 | 6/1991 | Fed. Rep. of Germany . | |
| 2261911 | 9/1975 | France . | |
| 2537524 | 6/1984 | France . | |
| 2064690 | 6/1581 | United Kingdom ............... | 91/369.3 |
| 2031086 | 4/1980 | United Kingdom ............... | 91/369.2 |

Primary Examiner—Edward K. Look
Assistant Examiner—Hoang Nguyen
Attorney, Agent, or Firm—Larry J. Palguta; Ken C. Decker

[57] ABSTRACT

The invention relates to a pneumatic brake booster comprising a casing (10), within which is located a piston (22, 14, 102) formed from a rear tubular part (22) supporting a skirt and which, by way of an unrolling diaphragm (12), defining a front chamber (16) connected permanently to a vacuum source and a rear chamber (18) connected selectively to the front chamber (16) or to the atmosphere by a valve mechanism (136, 138, 140) actuated by a control rod (34) capable of bearing, by way of the front face (32b) of a plunger (32), on the rear face (58a) of a reaction disk (58) fixed to a push rod (56), a spring (150) for the return of the control rod (34) being arranged between the skirt (14) of the piston and the plunger (32), the valve mechanism (136, 138, 140) comprising a shutter (138) made rigid by an insert (118) and interacting by an active part with a first valve seat (136) formed on the plunger (32) and with a second valve seat (140) formed on the piston (14), the shutter (138) being formed by a flexible tubular diaphragm (114), the active part of the shutter (138) being located between the two ends (112, 116) of the flexible tubular diaphragm (114). According to the invention, the plunger (32) comprises a front part (126), an active part (128) displaceable in translational motion relative to the front (126) and a rear part (124) screwed to the front part (126).

9 Claims, 2 Drawing Sheets

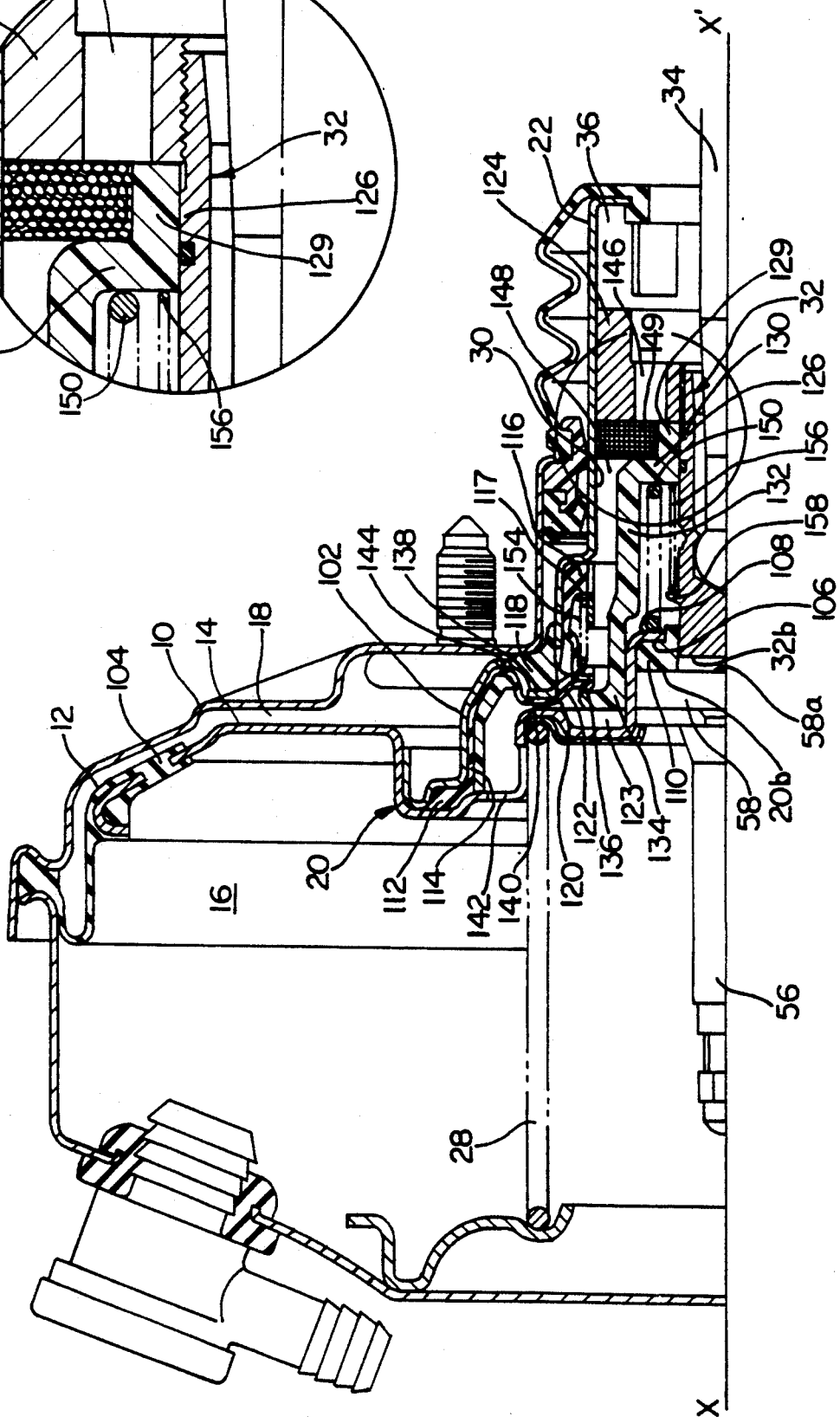

PNEUMATIC BRAKE BOOSTER WITH ADJUSTABLE JUMP

The present invention relates to pneumatic boosters and more particularly those of the type used for providing assistance for the braking of motor vehicles.

Boosters of this type conventionally comprise a piston which has a rear tubular part and a skirt and which, by means of an unrolling diaphragm, defines a front chamber connected permanently to a vacuum source and a rear chamber connected selectively to the front chamber or to the atmosphere by a valve means actuated by a control rod capable of bearing, by means of a plunger, on one of the faces of a reaction disk fixed to a push rod, a return spring for the control rod being arranged between the skirt of the piston and the plunger, the valve means comprising a shutter made rigid by an insert interacting by an active part with a first valve seat formed on the plunger and with a second valve seat formed on the piston, the shutter being formed by a flexible tubular diaphragm, the active part of the shutter being located between the two ends of the flexible tubular diaphragm.

Such boosters, as illustrated, for example, by the document EP-A-0,004,477, although they function satisfactorily, nevertheless have some disadvantages. Thus, to avoid the control rod having too long an idle travel, it is necessary to design the valve means in such a way that the "shutter lift" between the shutter and the second valve seat is as small as possible. It therefore follows that, during braking, the passage presented to the atmospheric air towards the rear chamber is reduced, as is the passage presented to the air from the rear chamber towards the front chamber during the brake release. The functioning of these boosters is therefore accompanied by air-suction noises which can become troublesome, the more so because the structure of the piston hub, having a single radial passage towards the rear chamber and a single axial passage towards the front chamber, also induces pronounced turbulence in the moving air. Such boosters also possess devices for adjusting the value of the booster jump, either to reduce its variations attributable to the production tolerances in series production or to set it at a particular value. These adjustment systems are often highly complex, but above all they are systems within the booster. The adjustment of the jump therefore has to be carried out, before the assembly of the booster, by complex methods involving specific tools which are difficult to use. Moreover, when the value of the booster jump is to be changed, either because it is the result of an incorrect setting or because it is to be given another value, it is then necessary to proceed with dismounting the booster in order to make this adjustment, this being lengthy, difficult and an additional cause of handling errors.

The object of the present invention is, therefore, to provide a booster, of which the idle travel is as small as possible, the jump is adjustable from outside to any desired value after the final assembly of the booster and the functioning is silent.

According to the present invention, the plunger comprises a front part, an active part displaceable in translational motion relative to the front part, and a rear part screwed to the front part.

The invention will now be described by way of example with reference to the accompanying drawings in which:

FIG. 2 is a side view in longitudinal half-section showing the central part of a pneumatic brake-booster produced according to the present invention; and FIG. 3 is an enlargement of the circled portion of FIG. 2.

FIG. 1 shows part of a brake-booster intended to be placed in the conventional way between the brake pedal of a vehicle and the master cylinder controlling the hydraulic brake circuit of this vehicle. By convention, the part of the booster facing the master cylinder is called the front of the booster and the part facing the brake pedal is called the rear of the booster.

Figure 1:
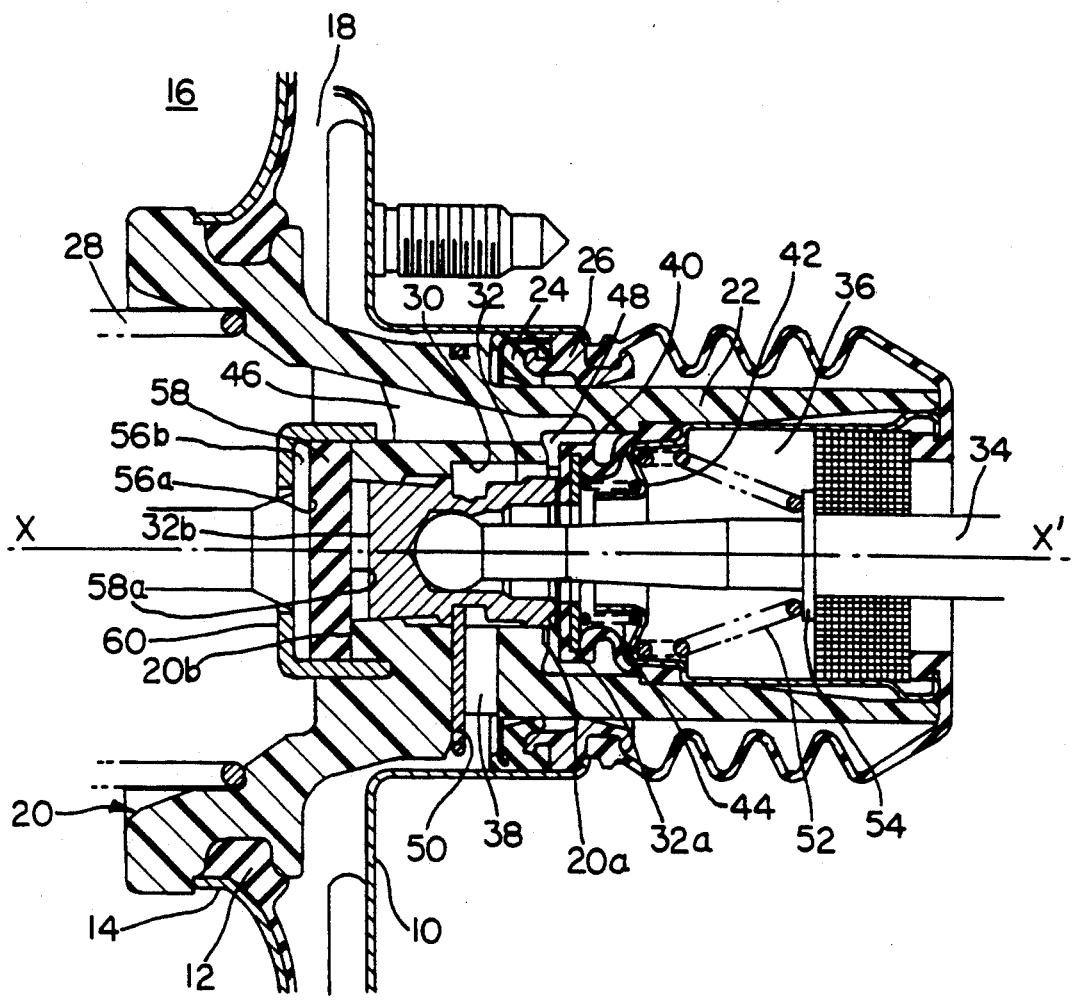
FIG. 1 is a side view in longitudinal section showing the central part of a pneumatic brake-booster of a known type, for example from the abovementioned document.

The booster of FIG. 1 comprises a shell-shaped outer casing 10 having rotational symmetry about an axis X—X'. Only the rear central part of this casing 10 is shown in FIG. 1.

A flexible elastomeric unrolling diaphragm 12, reinforced in its central part by a metal supporting disk 14 also called a skirt, defines within the space delimited by the casing 10 a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow boost piston 20 arranged along the axis X—X' of the booster. This hollow piston 20 is extended rearwards in the form of a tubular part 22 which passes sealingly through the rear wall of the casing 10. The sealing of this passageway is ensured by a reinforced annular gasket 24 which is fastened by means of a ring 26 in a tubular central part extending the rear wall of the casing 10 rearwards.

A compression spring 28 interposed between the piston 20 and the front wall (not shown) of the outer casing 10 normally keeps the piston 20 and the skirt 14 in a rear rest position, illustrated in FIG. 1, in which the rear chamber 18 is at its minimum volume and the front chamber 16 at its maximum volume.

In its central part located between the tubular rear part 22 and the front part in which the diaphragm 12 and the skirt 14 are fastened, the piston 20 has a bore 30 in which is slideably received a plunger 32 likewise having rotational symmetry about the axis X—X'. The front end of a control rod 34 of the booster, likewise arranged along the axis X—X', is mounted in the plunger 32 in the manner of a ball socket. The rear end (not shown) of this rod 34, projecting outside the tubular part 22 of the piston 20, is controlled directly by the brake pedal (not shown) of the vehicle.

The annular space 36 delimited between the control rod 34 and the tubular part 22 of the piston 20 opens out to the outside atmosphere at the rear of the booster, for example by way of an air filter. Towards the front, this same annular space can communicate with the rear chamber 18 via a radial passage 38 formed in the central part of the piston, when boost means controlled by the plunger 32 are actuated.

Conventionally, these boost means comprise a three-way valve having an annular shutter 40 mounted in the tubular part of the piston and two annular valve seats 20a and 32a formed respectively on the central part of the piston 20 and on the plunger 32.

The shutter 40 forms the front end, of smaller diameter, of a flexible elastomeric sleeve, the rear end of which terminates in a bead mounted sealingly inside the tubular part 22 of the piston 20. This bead is retained in place by a metal cup 42, on which bears a compression spring 44 tending to displace the shutter 40 forwards.

The annular valve seat 32a is formed on the rear end face of the plunger 32. Comparably, the annular valve seat 20a is formed on the rear end face of the central part of the piston 20, around the seat 32a. Depending on the position of the plunger 32 within the piston 20, this arrangement allows the shutter 40 constantly to bear sealingly on at least one of the valve seats 32a and 20a under the action of the spring 44.

A second passage 46 is formed in the central part of the piston 20, approximately in parallel with its axis X—X', in order to put the front chamber 16 of the booster in communication with an annular chamber 48 formed around the shutter 40, on the inside of the tubular part 22 of the piston 20. When the plunger 32 occupies its rear rest position, illustrated in FIG. 1, in which the shutter 40 bears sealingly on the seat 32a of the plunger 32 and is apart from the seat 20a of the piston 20, the front 16 and rear 18 chambers of the booster thus communicate with one another via the passage 46, the annular chamber 48 and the passage 38.

In a way itself also conventional, at least one stop member 50 mounted in the central part of the piston 20 delimits the axial stroke of the plunger 32 within the latter. The plunger 32 is normally retained in the rear rest position defined by the member 50 by means of a compression spring 52 interposed between the cup 42 and a washer 54, itself bearing on a shoulder formed on the control rod 34.

In its central part, the piston 20 has an annular front face 20b, at the center of which the bore 30 opens out. This annular front face 20b of the piston 20 acts on a rear face 56a of a push rod 56 via a reaction disk 58 made of a deformable material, such as an elastomer. More specifically, the push rod 56 and the reaction disk 58 are arranged along the axis X—X' of the booster in the extension of the control rod 34 and of the plunger 32. The rear surface 56a of the push rod 56 is formed on a disk-shaped plate 56b constituting the rear end of the rod 56. The plate 56b and the reaction disk 58 are covered by a cap 60 centered on the axis X—X' of the booster and interacting with an annular groove formed on the central part of the piston 20 around the annular front face 20b of the latter.

The functioning of this known booster is conventional and can be described briefly as follows.

When the booster is installed on a vehicle, the front chamber 16 communicates permanently with a vacuum source.

In a first step, the effect of the depression of the brake pedal by the driver is to equalize the prestressing force of the spring 52 less the prestressing force of the spring 44. During this slight displacement of the control rod 34 and of the plunger 32, under the action of the spring 44 the shutter 40 follows the seat 32a of the plunger 32 until it comes into contact with the seat 20a of the piston; the front 16 and rear 18 chambers of the booster are thus isolated from one another.

In this first phase of the actuation of the booster, the force exerted on the control rod 34 generates no force on the push rod 56 at the exit of the booster.

In a second phase of the actuation of the brake, the plunger 32 is displaced sufficiently forwards for the shutter 40 to be in sealing contact with the seat 20a of the piston and to begin to come away from the seat 32a of the plunger. Under these conditions, the rear chamber 18 of the booster is isolated from the front chamber 16 and comes into communication with the atmosphere. A boost force is therefore generated, tending to displace the piston 20 forwards. This displacement is transmitted to the push rod 56 by the reaction disk 58.

During this second phase of actuation of the brakes, the boost force exerted by the piston 20 does not deform the reaction disk 58 sufficiently for the latter to fill completely the space initially separating it from the plunger 32. Consequently, the output force applied to the master cylinder by the push rod 56 increases abruptly, whereas the force exerted on the control rod 34 remains unchanged.

This abrupt increase in the output force corresponds to what is called the booster jump, that is to say to the threshold beyond which the boost force generated in the booster and exerted on the reaction disk 58 by the piston 20 becomes sufficient for the front face 32b of the plunger to come into contact with the reaction disk 58.

Conventionally, as shown in FIG. 1, the value of the jump is adjusted by the stop member 50 which determines the rear rest position of the plunger 32 in relation to the piston 20 and therefore the distance at rest between the front face 32b of the plunger and the rear face 58a of the reaction disk. It will therefore be understood clearly that, if the booster jump does not have the desired value, it is necessary to dismount the booster completely in order to change this stop member or the plunger or both.

During the subsequent functioning of the booster, the rear chamber 18, which previously communicated with the front chamber 16 and was therefore under a reduced pressure, consequently sucks air at atmospheric pressure through the valve passage of small cross-section between the shutter 40 and the plunger seat 32a. The result is therefore a major obstacle to the passage of the air, and therefore noisy functioning. Moreover, the air coming, for example, from the upper half of FIG. 1 in order to penetrate into the passage 38 will have to go round the control rod 34 and the plunger 32 in order to arrive at the radial passage 38, thus resulting in a turbulent and noisy flow of the air in addition to the whistling attributable to passage through the gap between the shutter 40 and the plunger seat 32a.

The same phenomena occur during a brake release, when the air under a higher pressure is made to pass from the rear chamber 18 towards the front chamber 16 via the radial passage 38, the gap between the shutter 40 and the piston seat 20a, the annular chamber 48 around the shutter 40 and the axial passage 46. These phenomena will therefore not be described in detail.

It will thus be appreciated that it is highly desirable to provide a booster, the value of the jump of which can be adjusted easily to any desired value, without the need to dismount the booster, and therefore from outside the booster, and the functioning of which is silent.

This object is achieved by means of the invention, an exemplary embodiment of which is shown in FIG. 2, where the elements identical to those of FIG. 1 bear the same reference numerals.

It will be seen from FIG. 2 that the piston and the plunger have been thoroughly modified in order to achieve this object. The piston is composite, comprising a tubular rear part 22 and a front part rotational about the axis X—X' and forming an intermediate piston web 102 of general approximately frustoconical shape. Fastened, for example force-fitted, to the front end of larger diameter of the web 102 is the skirt 14, to the outer peripheral edge of which the unrolling diaphragm 12 is fastened, for example by means of orifices 104 made near the edge of the skirt 14 in order to complete the attachment of the material of the diaphragm 12. The inner peripheral edge of the skirt 14 is bent in the direction of the axis X—X' so as to form a shoulder 106 interacting with a shoulder 108 formed on a sleeve 110 having a front annular face 20b intended to interact with the reaction disk 58, as described in relation to FIG. 1.

Retained sealingly between the skirt 14 and the front end of larger diameter of the web 102 is a bead 112 forming the front end of a flexible tubular diaphragm 114, the rear end of which forms a bead 116 retained sealingly in the piston 20 in the region of connection of the rear tubular part 22 with the intermediate web 102, for example by means of a cylindrical metal cup 117.

An intermediate part of the flexible tubular diaphragm 114 receives an annular insert 118 on its rear face, in order to make it rigid in a plane perpendicular to the axis X—X'. The diaphragm 114 and the insert 118 have respective orifices 120 and 122 arranged opposite one another.

It can thus be seen that the diaphragm part 114 made rigid by the insert 118 can move axially in the annular volume 123 located between the rear face of the skirt 14 and the front face of the intermediate piston web 102, the skirt 14 and the web 102 being fixed to one another, the web 102 itself being the forward extension of the tubular rear part 22 of the piston.

The plunger 32 is formed with a rear part 124 sliding in the bore 30 of the tubular part 22 and a front part 126 sliding within the sleeve 110 and interacting with the reaction disk 58. These two parts are joined by the screwing of one to the other. A third part 128 of the plunger slides sealingly on the front part 126. This third part 128, or active part, of the plunger comprises a cylindrical portion 129 of an inside diameter equal to the outside diameter of the front part 126 of the plunger 32 and capable of sliding sealingly on it. This part 129 is extended at its front end by a part extending radially outwards to form an annular part 130 and then, from the outer peripheral edge of the latter, axially forwards within the tubular part 22 to form a cylindrical part 132 extending around the sleeve 110 and penetrating into the annular volume 123. The front end of the cylindrical part 132 is itself extended radially outwards by an annular part 134 which comes within the annular volume 123 in front of the part of the diaphragm 114 made rigid by the insert 118 and the outside diameter of which is slightly larger than the inside diameter of the insert 118. The annular part 134 forms a first valve seat with the diaphragm 114 made rigid by the insert 118 and itself forming a shutter 138. The valve seat advantageously consists of a bulge 136 formed, for example, on the outer peripheral edge of the annular part 134 and directed rearwards, or alternatively, as shown, by a bulge formed on the front surface of the diaphragm 114.

A second valve seat 140 is formed on the rear face of the skirt 14 over a circle of diameter slightly smaller than the outside diameter of the insert 118. The valve seat 140 can advantageously be formed on a convex part of the rear face of the skirt 14, so that the corresponding concave part of the front face of the skirt 14 constitutes a receptacle for the compression spring 28. As before, this valve seat 140 can be formed by a bulge made on the rear face of the skirt 14 or, as shown, by a bulge made on the front surface of the diaphragm 114.

Orifices 142 are made in the skirt 14 in order to put the front chamber 16 in communication with the part of the annular volume 123 located in front of the shutter 138. Likewise, orifices 144 are made in the intermediate web 102 in order to put the rear chamber 18 in communication with the part of the annular volume 123 located behind the shutter 138. Finally, orifices 146 are made in the rear part 124 of the plunger 32 in order to put the annular space 36 behind the plunger 32, where atmospheric pressure prevails, in communication with the annular volume 123 by way of the annular space 148 between the cylindrical part 132 of the plunger 32 and the tubular part 22 of the piston. Advantageously, as shown, an air filter 149 can be provided in the region of the orifices 146, in order to prevent impurities from intruding into the booster.

The piston 20 is returned to its rear rest position by the spring 28 acting on the front face of the skirt 14. It then comes up against the diaphragm 114 in its part made rigid by the insert 118, which itself comes up against the front face of the rear part of the casing 10. The second valve passage 138-140 between the valve seat 140 of the piston 20 and the shutter 138 is thus closed.

The plunger 32 and the control rod 34 are returned to their rear rest position by a return spring 150 bearing, on the one hand, on the rear face of the part of the skirt 14 forming the shoulder 106 and, on the other hand, on the front face of the annular part 130 of the third part 128 of the plunger 32. In this position, the plunger 32 comes, by means of the annular part 134 forming the first valve seat, up against the diaphragm 114 in its part made rigid by the insert 118, itself already up against the front face of the rear part of the casing 10, as seen above. The first valve passage 136-138 between the valve seat 136 of the plunger 32 and the shutter 138 is thus also closed.

Moreover, the shutter 138 is stressed forwards by a shutter spring 154 bearing, on the one hand, on the rear face of the diaphragm 114 made rigid by the insert 118 forming the shutter 138 and, on the other hand, on the front face of the bead 116 of the diaphragm 114 or that of the cylindrical cup 117, as shown.

Finally, the plunger 32 has a spring 156 arranged between the rear face of a shoulder 158 formed on the front part 126 of the plunger 32 and the front face of the annular part 130 of the third part 128 of the plunger 32, so as to stress the third part 128 away from the front part 126 and up against the rear part 124.

It can thus be seen that, according to the invention, there has been provided a booster comprising a composite movable piston consisting of the skirt 14 equipped with the unrolling diaphragm 12 and fixed to the intermediate web 102, itself extended rearwards by the tubular rear part 22, this movable piston being capable of acting on the push rod 56 via the reaction disk 58 by means of the front annular face 20b of the sleeve 110, the latter also serving as a guide element for the plunger 32.

The valve means consist of the shutter 138 which is formed on an intermediate part of a tubular diaphragm fastened at its ends to the composite movable piston and which interacts with a valve seat 136 of the plunger and a valve seat 140 of the composite movable piston.

The functioning of this booster produced according to the invention is easily inferred from the foregoing explanations. With the booster at rest, as shown in FIG.

2, the front chamber 16 is in communication with a vacuum source and is isolated from the rear chamber 18 by the valve passages 140-138 and 136-140 which are both closed, as seen above. The effect of actuating the control rod 34 is to cause the plunger 32 to advance counter to the action of the spring 150. The shutter 138 remains laid on the valve seat 140 of the piston 20 under the action of the spring 154, while the valve seat 136 begins to move away from the shutter 138. Air at atmospheric pressure is therefore admitted immediately into the rear chamber, if appropriate via the air filter 149, and via the orifices 146 in the rear part of the plunger 32, the annular space 148 between the cylindrical part 132 of the plunger 32 and the tubular part 22 of the piston, the valve passage 136-138, the orifices 120 and 122 formed in the diaphragm 114 and the insert 118 and finally the orifices 144 in the intermediate web 102.

It can thus clearly be seen that, according to one object of the invention, there has been provided a booster, the idle travel of which is the least possible since the entire operating phase necessary for isolating the front and rear chambers from one another has been eliminated. The only idle travel of the booster of the invention is that attributable to the elasticity of the first valve seat 136, which is necessary to ensure its sealing, but this can be considered to be negligible.

It can also be seen that, as a result of the invention, the air is admitted into the rear chamber 18 via the valve passage 136-138 which is of a diameter several times larger than in a conventional booster, as described in respect of FIG. 1. It has thus been possible to produce valve passages 136-138 of a diameter equal to five times the diameter of a conventional valve passage.

It follows, in this example, that the passage cross-section presented to the air is itself multiplied by five, and therefore that the air flow towards the rear chamber is also multiplied by five. A booster which functions silently since such an enlarged passage cross-section allows the air to circulate, without causing suction noise and other whistling, is thus indeed obtained. It goes without saying that the value of five is not critical, but has merely been chosen as an example.

Any other factor of enlargement of the valve passage in relation to a conventional booster can be selected according to the desired result.

It was seen above that the jump of the booster occurs at this stage of operation of the booster, the air admitted into the rear chamber of the booster producing a pressure difference between the two faces of the piston, thereby generating a boost force which tends to displace the piston 20 forwards, this force being transmitted to the push rod 56 by the shoulder 106 of the skirt 14 acting on the sleeve 110, itself acting on the reaction disk 58. There is then an abrupt increase in the force exerted by the push rod 56, until the reaction disk 58 is sufficiently deformed to fill the space initially separating its rear face from the front face of the plunger 32.

The value of the booster jump is therefore governed by the axial distance at rest between the front face of the plunger and the rear face of the reaction disk. By means of the invention, this value can easily be adjusted to any desired value, once the booster has been assembled. In fact, it has been seen that the plunger 32 consists of the rear part 124 screwed to the front part 126, a spring 156 bearing on a shoulder of the latter part in order to stress rearwards the active part 128, on which the first valve seat 136 is formed, up against the second part 124. It will readily be appreciated that, once the booster is completely assembled, as shown in FIG. 2, a relative rotation of the rear 124 and front 126 parts, for example by keeping one of them stationary, while a rotation about the axis X—X' is imparted to the other by means of a suitable tool, is converted into a translational displacement of the front part 126 in relation to the third part 128. The axial dimension or distance between the front face of the plunger 32 and the first valve seat 136 of the plunger is thus varied. Since the latter bears, at rest, on the shutter 138, on which the skirt 14 of the piston 20 likewise bears to form the second piston valve seat 140, and since the skirt 14 has the shoulder 106 bearing on the shoulder 108 of the sleeve 110, the front annular face of which is in contact with the reaction disk 58, the relative rotation of the rear 124 and front 126 parts consequently indeed varies the distance between the front face of the plunger 32 and the rear face of the reaction disk 58.

The value of the booster jump according to the invention can therefore be adjusted from outside in a simple way by any suitable method. It is possible, for example, to apply to the push rod 56 a force corresponding to the desired booster jump, thereby bringing about a deformation of the reaction disk 58.

It will then be sufficient to screw the front part 126 of the plunger into the rear part 124 in order to cause the front face 32b of the plunger 32 to advance until it comes into contact with the deformed part of the rear surface 58a of the reaction disk, this contact being detectable by any means, for example with the aid of a strain gage placed on the control rod 34. By then releasing the force exerted on the push rod 56, a booster set to the desired jump value will be obtained. The booster can also be operated by actuating it with its control rod 34. Force sensors on the control rod 34 and the push rod 56 will make it possible to trace a graph of the output force as a function of the input force and consequently set the booster jump to the desired value.

There has therefore been provided, according to the invention, a booster, the jump value of which can be adjusted to any desired value from outside the booster and therefore without the need to dismount it. This booster has an extremely small idle travel and functions without noise.

It will be appreciated that the phenomenon of a reduction of the operating noise of the booster likewise occurs during a brake release. In fact, when the force applied to the control rod decreases, the latter retracts and in its movement drives the plunger 32. The valve seat 136 of the plunger 32 thereby returns into contact with the shutter 138, the valve seat 140 still being in contact with the shutter 138. When the plunger 32 continues to retract, the valve seat 136 of the plunger then causes the shutter 138 to move away from the valve seat 140. The air contained in the rear chamber 18 is thus sucked into the front chamber via the orifices 144 in the intermediate web 102, the orifices 122 and 120 in the diaphragm 114 and the insert 118, the valve passage 138-140 and finally the orifices 142 in the skirt 14. It can thus be seen, here again, that the air is made to flow through the valve passage 138-140 of a diameter clearly larger than that of conventional valve passages and therefore of greater area allowing a higher flow, thus likewise resulting in silent functioning in the brake-release phase.

The invention also makes it possible to reduce the operating noise of the booster in substantial proportions. It was seen, in fact, that, during braking, the air flows via the orifices 146, the annular space 148, the valve passage 136-138 and the orifices 120, 122 and 144 and, during the brake release, it flows via the orifices 144, 122 and 120, the valve passage 138-140 and the orifices 142. The special design of the booster according to the invention makes it possible to ensure that there is an equal number of orifices 142, 120, 122, 144 and 146 uniformly distributed about the axis X—X', so that their centers are in the same plane, as shown in FIG. 2. Thus, the air masses set in motion during the functioning of the booster of the present invention will have a velocity of which the components will be contained in only one plane, for example that of FIG. 2. In other words, the flow of air in the booster is perfectly symmetrical about the axis X—X' under all operating conditions, that is to say all the turbulence and the noises resulting from it are eliminated.

It can thus clearly be seen that, according to the present invention, there has been provided a pneumatic booster in which the special arrangement of the valve means and plunger means allows an easy adjustment of the value of the jump by acting from outside the fully assembled booster, the booster possessing, furthermore, a greatly reduced idle travel and silent functioning. Of course, the invention is not limited to the embodiment described by way of example, but is capable of acquiring many alternative versions which will appear to an average person skilled in the art. Thus, for example, the unrolling diaphragm and the flexible tubular diaphragm on which the shutter is formed can be produced in one piece. Likewise, the invention can be applied to boosters in tandem or with an additional chamber.

We claim:

1. A pneumatic brake-booster, comprising a casing within which is located a piston comprising a rear tubular part supporting a skirt and which, by means of an unrolling diaphragm, defines a front chamber connected permanently to a vacuum source and a rear chamber connected selectively to one of the front chamber and atmosphere by valve means actuated by a control rod capable of bearing, by means of a front face of a plunger, on a rear face of a reaction disk adjacent a push rod, a spring for the return of the control rod arranged between the skirt of the piston and the plunger, the valve means comprising a shutter made rigid by an insert and interacting by an active part with a first valve seat formed on the plunger and with a second valve seat formed on the piston, and the shutter comprising a flexible tubular diaphragm with the active part of the shutter located between two ends of the flexible tubular diaphragm, characterized in that the plunger comprises a front part, an active part displaceable in translational motion relative to the front part and a rear part screwed to the front part, the active part of the plunger sliding sealingly on the front part and engaging the rear part, and a spring arranged between the front part and the active part of the plunger.

2. The booster according to claim 1, wherein the front part comprises the front face of the plunger which can bear on the rear face of the reaction disk, and the first valve seat formed on the active part of the plunger.

3. The booster according to claim 1, wherein the piston comprises an intermediate piston web defining an annular volume with the skirt of the piston, the first and second valve seats and the shutter defining parts of the annular volume, and the second valve seat located at the skirt of the piston.

4. The booster according to claim 3, wherein orifices are located in the skirt in order to put the front chamber in communication with the annular volume, and orifices are located in the intermediate web in order to put the rear chamber in communication with the annular volume.

5. The booster according to claim 4, wherein the shutter has orifices located in the active part thereof between the first valve seat and the second valve seat and allowing communication between the front chamber and the rear chamber.

6. The booster according to claim 5, wherein orifices are located in the plunger in order to put the annular volume in communication with atmosphere.

7. The booster according to claim 6, characterized in that the orifices in the plunger, shutter, skirt and intermediate piston web are distributed uniformly about an axis of symmetry of the booster, are of equal number, and are aligned about the axis of symmetry to have centers located in linear alignment.

8. The booster according to claim 1, characterized in that the spring for the return of the control rod is arranged between the skirt of the piston and the active part of the plunger.

9. The booster according to claim 1, characterized in that a shutter spring stresses the active part of the shutter forward, the shutter spring concentric relative to the spring for the return of the control rod and of larger diameter.

* * * * *